Sept. 8, 1970 D. L. SNELLMAN 3,527,406

CARD READER APPARATUS

Filed Aug. 30, 1968

DONALD L. SNELLMAN
INVENTOR.

BY Seed, Berry & Dowrey

ATTORNEYS

1

3,527,406
CARD READER APPARATUS
Donald L. Snellman, Seattle, Wash., assignor to Norfin, Inc., Seattle, Wash., a corporation of Washington
Filed Aug. 30, 1968, Ser. No. 756,597
Int. Cl. H01h *43/08;* G06k *7/00;* B65h *3/06*
U.S. Cl. 235—61.11 7 Claims

ABSTRACT OF THE DISCLOSURE

A card reader designed to translate information on an EAM card into electrical commands. The electrical commands are routed throughout the system within which the reader is used for performing various functions including controlling the advancement of the EAM card through the reader.

BACKGROUND OF THE INVENTION

The present invention relates generally to apparatus for reading information from a card of the type generally referred to as an "electrical accounting machine" (EAM) card. More specifically, the present invention relates to a simplified improved card reader for a system requiring synchronous movement of an EAM card with an external drive mechanism.

A specific example of a system wherein an EAM card, or other recording media, is moved synchronously with an external drive mechanism is a sheet sorting machine or collator. A collator receives a plurality of sheets at an input and sorts a specific number of these sheets into a plurality of bins or trays at an output. The bins are commonly stacked vertically and the collator employs a distributor that starts at one bin in the stack inserting a specfic number of sheets into that bin then proceeds to a subsequent bin. As the collator drive mechanism moves the distributor from bin to bin it must be told how many sheets to insert in a particular location. This information may be provided by a recording medium being driven past sensing means for readout synchronously with movement of the distributor.

The apparatus required to synchrononize the movement of the card with the external drive mechanism is often quite complicated including combinations of electrical and mechanical devices to both the sense and command movement of the card and drive mechanism. In addition, the reader should contain some means for aligning the card so that information relating to a particular bin is adjacent the reader sensing means when the collator distributor is at that particular bin.

It is accordingly the object of the present invention to simplify and improve EAM card readers. It is a specific object of the present invention to provide, in a card reader, simplified card mechanisms for coupling to an external drive mechanism. It is another object to provide improved apparatus for feeding a card through the card reader and for maintaining the card aligned relative to the sensing means so as to correspond to particular positions of an external drive mechanism. It is yet another object of the present invention to provide means for aligning an edge of an EAM card to some desired position relative to the readout means incorporated in the card reader. It is yet a further object of the present invention to include in the foregoing alignment means, apparatus which will allow feed rollers to engage a card prior to deactivation of the alignment or registration means.

2

DESCRIPTION OF THE DRAWINGS

These and other objects of the invention will be apparent from the description of the invention and accompanying drawings which are.

The present card reader is designed to translate information on an electrical accounting machine (EAM) card into electrical commands. The electrical commands are routed throughout the system with which the reader is used for performing various tasks including controlling the advancement of the EAM card through the reader. The card reader includes a throat through which cards are passed. Sensing means are disposed in the throat for reading information on the cards. Feeding means engage a card in the throat to advance it past the sensing means, and registration means are employed to align an edge of a card relative to the sensing means. The registration means interacts with the feeding means to release pressures exerted by the feeding means on a card to allow it to be aligned. However, the registration means allows engagement of a card by the feeding means prior to inactivating the registration means. This insures that the aligned card remains aligned to the sensing means when it is advanced past the sensing means.

Figure 1:
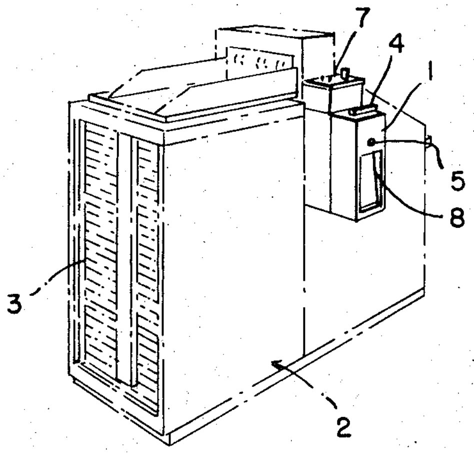
FIG. 1 is a perspective view of the card reader of the present invention shown incorporated with a collator system.

In FIG. 1, a card reader according to the present invention, designated generally by the reference numeral 1, is shown connected to a collator system 2. A collator is a device which sorts sheets of paper into a plurality of bins 3. The function of the card reader is to translate information on the EAM card, indicating the number of sheets to be fed into a particular bin, into machine instructions. The collator includes a deflector device (not shown) which proceeds from one bin to another at some established rate. The collator interrogates the card reader at each station to determine the number of sheets to be inserted into that particular bin.

For a more detailed description of collator operation and the deflector assembly, refer to copending application Ser. No. 521,077 filed Jan. 17, 1966, assigned to the assignee of the present invention.

An EAM card is inserted into the card reader through slot 4. Button 5 is pressed to allow the EAM card to be fully inserted into the reader. Button 5 positions index pins in the path of the card allowing it to be initially aligned. The collator sorting operation begins by an operator actuating appropriate switches on control panel 7. The distributor, internal to the collator, proceeds to the first in the plurality of bins 3, stops and interrogates the EAM card to determine the number of sheets desired for this bin. Appropriate electronics located in the control panel 7 perform the necessary control operations. When the desired number of sheets are delivered to the particular bin, the distributor moves to the next bin. The feeding apparatus in the card reader advances the card to a position corresponding to the position of the distributor at the subsequent bin, i.e. the card is moved synchronously with the deflector. The EAM card is advanced through the card reader in this manner as the deflector proceeds from one bin to the next. The EAM card exits the reader at orifice 8. The same card may be run through the card reader again if other sheets are to be sorted into the plurality of bins 3 in a like manner. To sort sheets of different quantities into different bins, it is only necessary to mark a new EAM card according to the desired distribution.

Figure 3:
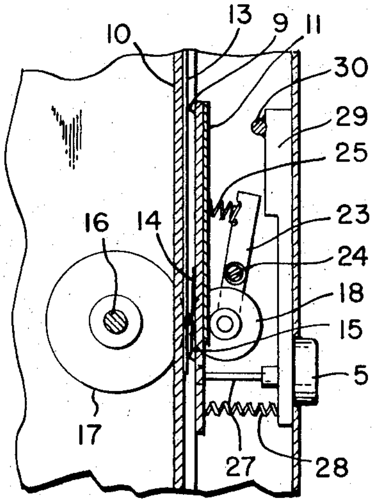
FIG. 3 is an end elevational view of the card reader feeding and registration apparatus shown in FIG. 2.

The card feeder throat 9 is best seen in FIG. 3. The throat is formed in the space between the two parallel plates 10 and 11. A card 13 is shown inserted through slot 4 into the throat. Sensing means for detecting information on the card is positioned in throat 9 in the path of a card fed therethrough. Normally, the information on the card is coded in the form of holes. The presence of a hole at a particular location on the card alone or in combination with holes at other locations represents a particular instruction to the collator. The information may be recorded as other irregularities on the card such as reflective and non-reflective discontinuities. This type card requires optical apparatus to sense or read out the information on the card.

FIG. 3 illustrates a preferred embodiment for reading EAM cards having information recorded thereon in the form of holes. The sensing means comprises a feeler switch disposed within the throat which is closed and opened according to whether there is a hole in the card when between the feeler switch. The feeler switch is formed from leaf spring 14 (an electrical conductor) mounted on plate 11 and an electrical conductor (not shown) on plate 10. If plate 10 is a conductive material, it may serve as the conductor. Spring 14 is biased to maintain point 15 in electrical contact with plate 10. Point 15 is shaped to allow passage of a card through the throat. Plate 10 and leaf spring 14 are electrically terminated at logic circuitry in control panel 7 (FIG. 1). The existence or absence of electrical contact between point 15 and plate 10 is noted by the logic circuitry and is used to convey information to the collator. Although only one leaf spring 14 is shown in FIG. 3, it should be understood that a plurality of leaf springs, i.e., switches, may be disposed across the width of throat 9 to detect the presence of a plurality of holes in the EAM card.

The feeding means includes feed rollers 17 and idle rollers 18. As shown in FIG. 3, a portion of the peripheries of the idle and feed rollers extend through plates 10 and 11 for engagement with each other or a card between them. Two feed rollers 17 are mounted on shaft 19 spaced apart thereon a distance less than the width of an EAM card. Shaft 19 is drivingly coupled to a power source, i.e., a drive mechanism on the collator, through worm gear set 19 and 20. The sprocket and chain assembly designated generally by the reference number 22 is directly connected to the collator deflector means. The gear ratio for the worm gear set 19 and 20 and the teeth ratio in the chain and sprocket assembly are selected to cause the feed rollers 17 to advance a card in throat 9 past point 15 a distance corresponding to a distance moved by the deflector between adjacent bins.

Figure 2:
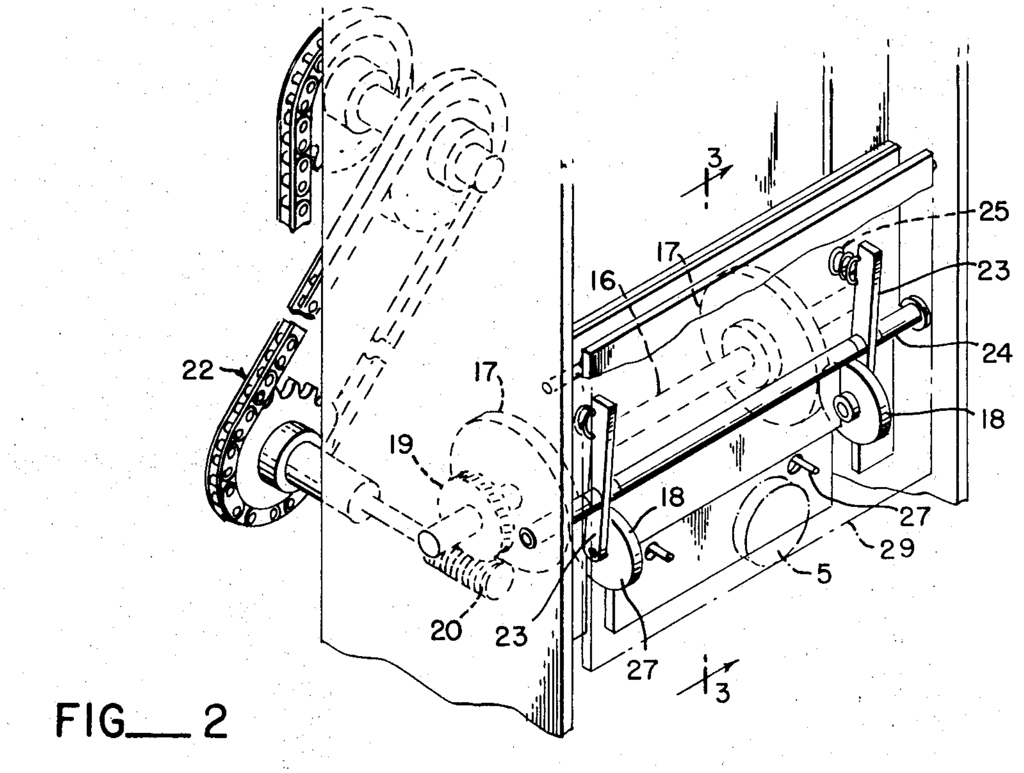
FIG. 2 is an enlarged right hand perspective view of a card reader partially cut away showing the internal feeding and registration apparatus.

Two idle rollers 18, shown in FIG. 2, are journaled in arms 23 which are in turn pivotally mounted on shaft 24 attached to the frame of the card reader. Two coil springs 25 are coupled to plate 11 and arms 23. The springs are positioned in the side of shaft 24 opposite idle rollers 18 thereby urging or biasing the idle rollers into contact with the feed rollers. The biased engagement between the idle and feed rollers insures positive feeding of cards past the sensing means.

Again referring to FIG. 3, the registration means includes index pins 27 (two are shown in FIG. 2) extending through plate 11 into throat 9. Index pins 27 are mounted on a movable support means including spring 28, platform 29 and bearing 30. Button 5 discussed in relation to FIG. 1 is an extension on platform 29. When button 5 is pressed inward, index pin 27 slides through plate 11 until it contacts plate 10. The inserted pin provides means against which a card abuts thereby registering the card to point 15.

Arms 23 supporting idler rollers 18 are positioned relative to platform 29 such that as platform 29 pivots about bearing 30, when button 5 is depressed, spring 25 is compressed, thereby withdrawing idle rollers 18 from throat 9. This allows a card to be inserted into throat 9 down to index pins 27. The bottom edge of card 13 abuts against index pins 27 to align the edge of the card relative to points 15 on the feeler switch. The registration of the card is essential to establish a correlation between the holes on an EAM card and the bins in collator 2.

When pressure is removed from button 5, spring 28 forces platform 29 counter-clockwise about bearing 30. As the registration pin is withdrawn from throat 9, the platform 29 releases coil spring 25 allowing idle rollers 18 to grip card 13. The idle rollers grip the aligned card before index pins 27 are removed from the throat thereby insuring the rollers engage the card while aligned to the sensing means.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. In a system of the type wherein a recording medium is advanced past sensing means for reading information on the recording medium synchronously with a drive mechanism, the improvement comprising apparatus for aligning card recording media to said sensing means and for advancing an aligned card past said sensing means including;

feeding means engageable with a card mechanically coupled to said drive mechanism for synchronously advancing a card past said sensing means, registration means selectively positionable into the path of the card for initially aligning a card relative to said sensing means mechanically coupled to said feeding means to allow initial alignment of a card and to insure alignment of a card when engaged by said feeding means, and means simultaneously operable with said registration means for disengaging said feeding means.

2. The apparatus of claim 1 wherein said feeding means includes;

a feed roller mechanically coupled to said drive mechanism for synchronous rotation therewith, and an idle roller disposed relative to said feed roller for engaging a card between the peripheries of said rollers, said idle roller journaled on a movable axle biased to urge contact between said rollers, said feed disengaging means including means for moving said idle roller away from said feed roller.

3. The apparatus of claim 2 wherein said registration means includes;

retractable index means engageable with a card for aligning a card relative to said sensing means, and a slidable support for moving said index means into position for engagement with a card and said feed disengaging means being operable to release said idle roller prior to withdrawal of said index means from a card engagement position insuring engagement of an aligned card by said rollers.

4. A card reader comprising;

first and second generally parallel plates defining in the space between them a throat for passing cards, sensing means disposed for detecting information on a card in said throat, feeding means disposed for engagement with a card in said throat for advancing the card past said sensing means, registration means selectively positionable in the path of the card for aligning a card relative to said sensing means disposed relative to said throat, and means to effect a disengagement of said feeding means when said card is engaged by said registration means for initial alignment of a card and subsequently to effect engagement by said feeding means of the aligned card.

5. A card reader according to claim 4 wherein said feeding means includes;

a feed roller adapted for coupling to a drive mechanism journaled adjacent said first plate having a portion of its periphery extending through said first plate into said throat for engagement with a card, an idle roller journaled adjacent said second plate with a portion of its periphery extending therethrough into said throat disposed opposite said feed roller for engagement of a card between said rollers, a lever arm coupled to said idle roller for movement of said idle roller into and out of said throat, and first bias means coupled to said lever arm for urging said idle roller into said throat.

6. A card reader according to claim 5 wherein said registration means includes;

an index pin disposed adjacent said second plate slidable therethrough for engagement with said first plate for aligning a card in said throat relative to said sensing means, a support bar coupled to said index pin movably mounted for inserting and withdrawing said index pin into and from said throat, and second bias means coupled to said support bar for urging withdrawal of said pin from said throat, said support bar and second bias means disposed relative to said lever arm to withdraw said idle roller from said throat when said index pin is inserted therein and to move said idle roller into said throat prior to withdrawal of said index pin from the throat.

7. The card reader of claim 4 wherein said sensing means includes a feeler switch disposed in said throat for detecting irregularities in a card passed through the throat.

References Cited

UNITED STATES PATENTS

| | | | |
|---|---|---|---|
| 1,153,339 | 9/1915 | Rogers | 271—36 |
| 2,993,692 | 7/1961 | Thomas | 270—58 |
| 3,059,922 | 10/1962 | Marshall | 271—36 |
| 3,066,863 | 12/1962 | Wilson | 235—61.11 |
| 3,112,378 | 11/1963 | Holzer | 235—61.113 |
| 3,132,241 | 5/1964 | Wolfheimer. | |
| 3,139,520 | 6/1964 | Gassino | 235—61.113 |
| 3,194,946 | 7/1965 | Rabinow | 235—61.6 |
| 3,201,570 | 8/1965 | Perez et al. | 235—61.113 |
| 3,414,254 | 12/1968 | Snellman et al. | 270—58 |
| 3,414,256 | 12/1968 | Mestre | 270—58 |

OTHER REFERENCES

IBM Technical Disclosure Bulletin: vol. 9, No. 12, May 1967, pp. 1760–1, Credit Card Reader, by G. W. Bowers et al.

DARYL W. COOK, Primary Examiner

R. M. KILGORE, Assistant Examiner

U.S. Cl. X.R.

200—46; 271—36